(12) United States Patent
Deutsch et al.

(10) Patent No.: US 6,591,743 B2
(45) Date of Patent: Jul. 15, 2003

(54) COTTON PROCESSING SYSTEM AND METHOD OF OPERATION

(75) Inventors: Timothy Arthur Deutsch, Newton, IA (US); Virgil Dean Haverdink, Ankeny, IA (US); Maurice Vincent Salz, Ankeny, IA (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 09/775,406

(22) Filed: Feb. 1, 2001

(65) Prior Publication Data

US 2002/0100375 A1 Aug. 1, 2002

(51) Int. Cl.⁷ ................................................ B30B 9/30
(52) U.S. Cl. ........................... 100/8; 100/102; 100/189; 100/88; 56/341
(58) Field of Search .................... 56/148, 153, 344, 56/341, 13.5, 1, 343, 28, 33, 36, 8; 100/88, 87, 102, 189, 37

(56) References Cited

U.S. PATENT DOCUMENTS

| | | | | |
|---|---|---|---|---|
| 3,583,164 A | * | 6/1971 | Sherrill | 100/100 |
| 3,897,018 A | | 7/1975 | Wilkes et al. | 241/223 |
| 4,548,131 A | * | 10/1985 | Williams | 100/1 |
| 4,798,044 A | * | 1/1989 | Viaud et al. | 100/88 |
| 4,938,004 A | * | 7/1990 | Merritt et al. | 53/399 |
| 5,030,053 A | * | 7/1991 | Wickizer | 298/20 R |
| 5,551,218 A | * | 9/1996 | Henderson et al. | 100/13 |
| 5,752,374 A | * | 5/1998 | Allworden et al. | 100/100 |
| 6,032,446 A | | 3/2000 | Gola et al. | 56/341 |
| 6,263,650 B1 | * | 7/2001 | Deutsch et al. | 56/16.4 B |

* cited by examiner

*Primary Examiner*—Allen Ostrager
*Assistant Examiner*—Shelley Self

(57) ABSTRACT

Cotton receiving structure includes a receptacle supported on a wheeled frame and a floor conveyor moving cotton towards an upright set of fingered rotors which feed the cotton into an upright hopper. The fed cotton is directed into a baler mounted on the frame for forming and wrapping. The compact wrapped bale is discharged from the baler and loaded onto a transport device using conventional bale handling equipment such as a tractor-mounted loader. The baler can be mounted directly on the frame with the receptacle and the hopper for movement as a unit to the desired field location for receiving cotton from the harvester basket. In an alternate embodiment, the baler can be a separate unit towed behind or towed independently of the frame and the receiver and hopper.

27 Claims, 2 Drawing Sheets

COTTON PROCESSING SYSTEM AND METHOD OF OPERATION

FIELD OF THE INVENTION

The present invention relates generally to agricultural implements and, more specifically, to handling and packaging equipment and processes for cotton.

BACKGROUND OF THE INVENTION

Present cotton harvesting methods often employ a module builder situated at the end of a field for receiving cotton harvested by a self-propelled cotton picker or stripper. A large basket or receptacle on the harvester is unloaded into the open top of the module builder which is rectangular in configuration and includes hydraulic rams for forming a rectangular bale and ejecting the bale after formation. The cotton module weighing several thousand pounds or more is then loaded into a specially built trailer or truck for transport to the cotton mill. The trailers are relatively expensive and therefore limited in number. As a result, the modules often have to remain in the field extended periods of time until a trailer or truck becomes available, and bale integrity and handling and transport times are thereby compromised.

Recent developments in on-board processing of harvested cotton have provided an improved system wherein compacted bales are formed directly on the harvester. Such a system is shown, for example, in U.S. Pat. No. 6,032,446. The compacted bales reduce cotton loss, increase transportability and facilitate expedited handling to the cotton gin. However, most harvesters presently operating in the field do not have bale-forming capabilities so the advantages of the system cannot be fully realized. Further, making a transition from the conventional module builder systems to a new bale handling system is slowed by reluctance of cotton processing facilities to provide multiple handling systems, including one for conventional module systems and another for the new bale system, especially when use of the new bale system is limited to those operators who have recently purchased new cotton harvesters.

A system for forming an 8-foot square bale is shown in U.S. Pat. No. 4,548,131. The square baler is relatively large and expensive and lacks easy mobility. The device also requires an air system to move the cotton towards the top of the unit. The flow of cotton is intermittent, and interrupted during each cycle of the compressing ram and during bale tying. The tying mechanism is also complex and costly for the square bale system.

BRIEF SUMMARY OF THE INVENTION

It is therefore an object of the invention to provide an improved cotton handling system. It is a further object to provide such a system which overcomes most or all of the aforementioned problems.

It is another object of the invention to provide an improved cotton handling system which facilitates efficient utilization of time and equipment, reduces labor costs, expedites handling of cotton from field to gin, and reduces exposure of modules in the field. It is yet another object to provide such a system wherein formed bales are substantially easier to handle and load and are compatible with conventional round bale equipment. It is yet a further object to provide such a system which eliminates the need for expensive, specialized trailers or trucks to transport cotton. It is still another object to provide such a system which is mobile and increases harvester productivity.

It is another object of the present invention to provide a cotton handling system which will help implement process conversion from conventional module handling systems to round bale handling systems.

A cotton handling system includes a module builder or similar cotton-receiving structure having a configuration generally conforming to a conventional module builder but without hydraulic rams to compress the cotton in the structure. Harvested cotton from a picker or stripper is dumped into the receiving structure. A conveyor moves the loose cotton towards an upright set of rollers which are driven in the same direction to strip the cotton from the module and feed the cotton into an upright hopper or plenum. The cotton in the plenum falls onto a conveyor where it is directed into a baler for forming and wrapping. Alternatively, the feed mechanism of an ordinary round baler can be positioned to receive the cotton from the hopper. The compact wrapped bale is discharged from the baler and loaded onto a transport device using conventional bale handling equipment such as a tractor-mounted loader for transport to a gin for processing.

In another embodiment of the invention, a bale handling system moves the formed bale directly onto a bale transport device. The transport device can advance one bale width as each bale is loaded to accommodate two or more bales. Bale movement from the forming chamber can be by conveyor or lift arms, or a gravity feed system can be used wherein a hydraulic lift moves the unit vertically to provide the slope necessary to regulate the rolling action of the bale onto the transport device and to accommodate transport devices of varying heights.

The baler can be mounted directly on a wheeled frame with the receiver and the hopper for movement as a unit to a convenient field location. To increase productivity, the unit can be towed in the field while bales are being formed so the harvester does not have to travel to the unit when the harvester basket is filled. In another embodiment, the baler can be a separate unit towed behind or towed independently of the frame and the receiver and hopper and can be used apart from the processing system for conventional hay or straw baling.

The system provides more efficient use of time and equipment, reduces labor costs, and eliminates need for unique module hauling trailers. The bales are easily formed and can be handled with conventional bale handling equipment. With use of a round baler, the bales have better integrity and reduced deterioration and cotton loss compared to rectangular modules or bales. The system permits operators to form bales without need for an on-board baler on their cotton harvesters, and therefore there is more incentive for cotton gins to convert to round bale processing. The cotton remains relatively loose within the compartment, but, if desired, the cotton can be compacted with conventional ram structure to increasing storage capacity.

These and other objects, features and advantages of the present invention will become apparent to one skilled in the art upon reading the following detailed description in view of the drawings.

DETAILED DESCRIPTION OF THE DRAWINGS

Figure 1:
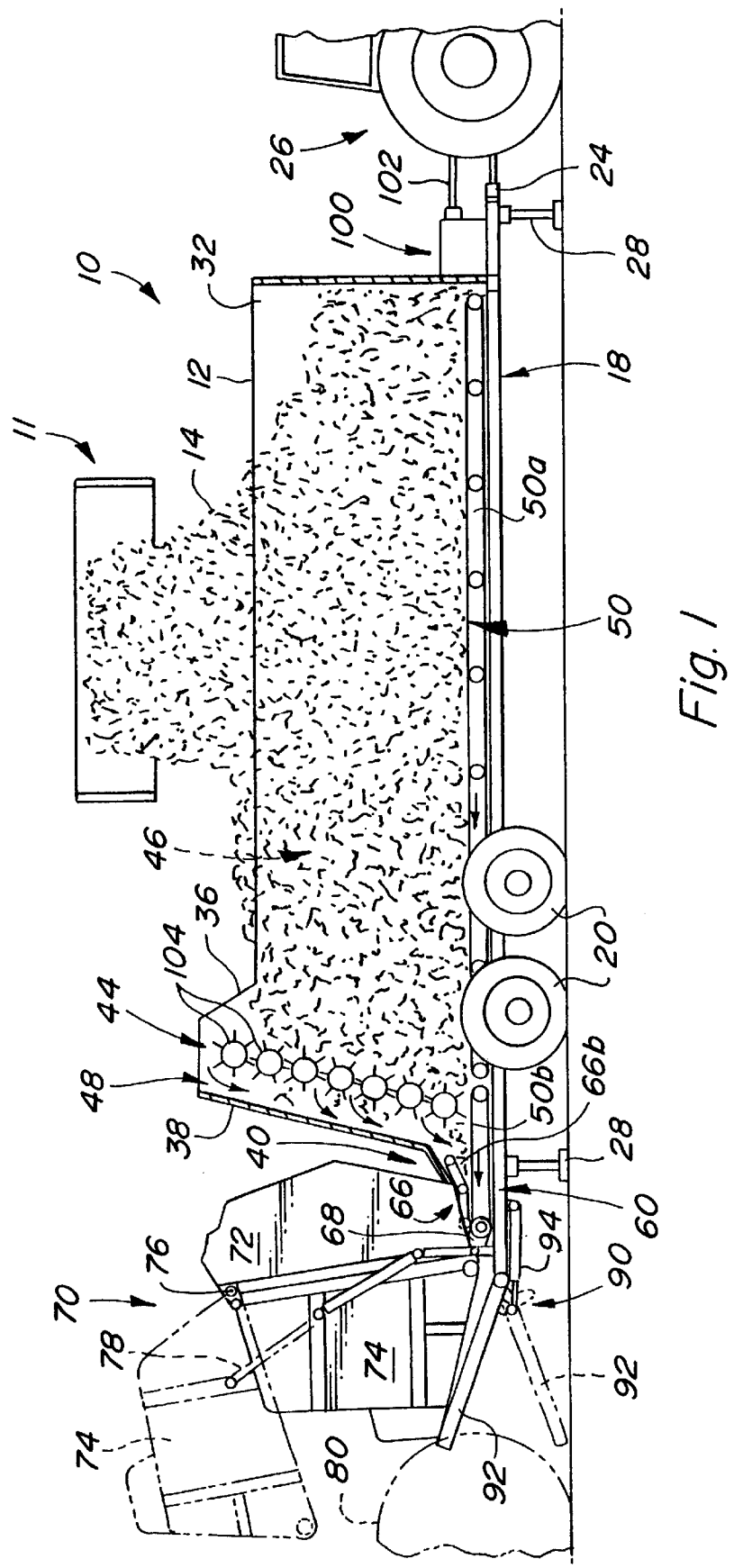
FIG. 1 is a side view, partially in section, of a cotton processor system constructed in accordance with the teachings of the invention.

Referring now to FIG. 1, therein is shown an open-topped structure 10 for receiving harvested cotton from the basket of a cotton picker or stripper 11. The structure 10 is generally in the configuration of a conventional module builder having an open top 12 for receiving harvested cotton 14 from a harvester basket. The structure 10 includes a main frame 18 supported by sets of rear wheels 20 positioned on opposite sides of the frame and by forward hitch structure 24 adapted for connection to a towing vehicle such as a tractor 26 for movement in the cotton field to a convenient location for receiving the cotton. If necessary for stationary operation, retractable jack stands 28 are selectively positioned to support the forward and aft ends of the structure 10 from the ground when positioned as shown to receive and process the harvested cotton 14.

An upright front wall 30 is supported from the forward end of the frame 18 and extends between a pair of upright side walls 32 which extend rearwardly to a location behind the rear wheels 20. The top edges of the side walls 32 extend upwardly at 36 and then rearwardly to a connection with an aft wall 38 which slopes downwardly and rearwardly towards an egress area indicated generally at 40. Upright cotton dispensing structure 44 defines the aft end of a generally rectangular cotton containing bin structure or compartment indicated at 46 and the forward wall of a plenum or hopper area 48 forwardly of the aft wall 38. A floor conveyor 50 includes a forward conveyor 50a defining the bottom of the compartment 46 and a rearward conveyor 50b defining the bottom of the hopper area 48. The conveyor 50a moves the mass of cotton 14 against the dispensing structure 44 which pulls cotton from the mass and directs the cotton into the hopper area 48. The cotton directed into the hopper area 48 falls towards the egress area 40 and onto the conveyor 50b. Preferably, the cotton remains relatively loose within the compartment, but, if desired, the cotton can be compacted with conventional ram structure (not shown) for increasing the amount of cotton stored prior to being directed against the dispensing structure 44.

Figure 3:
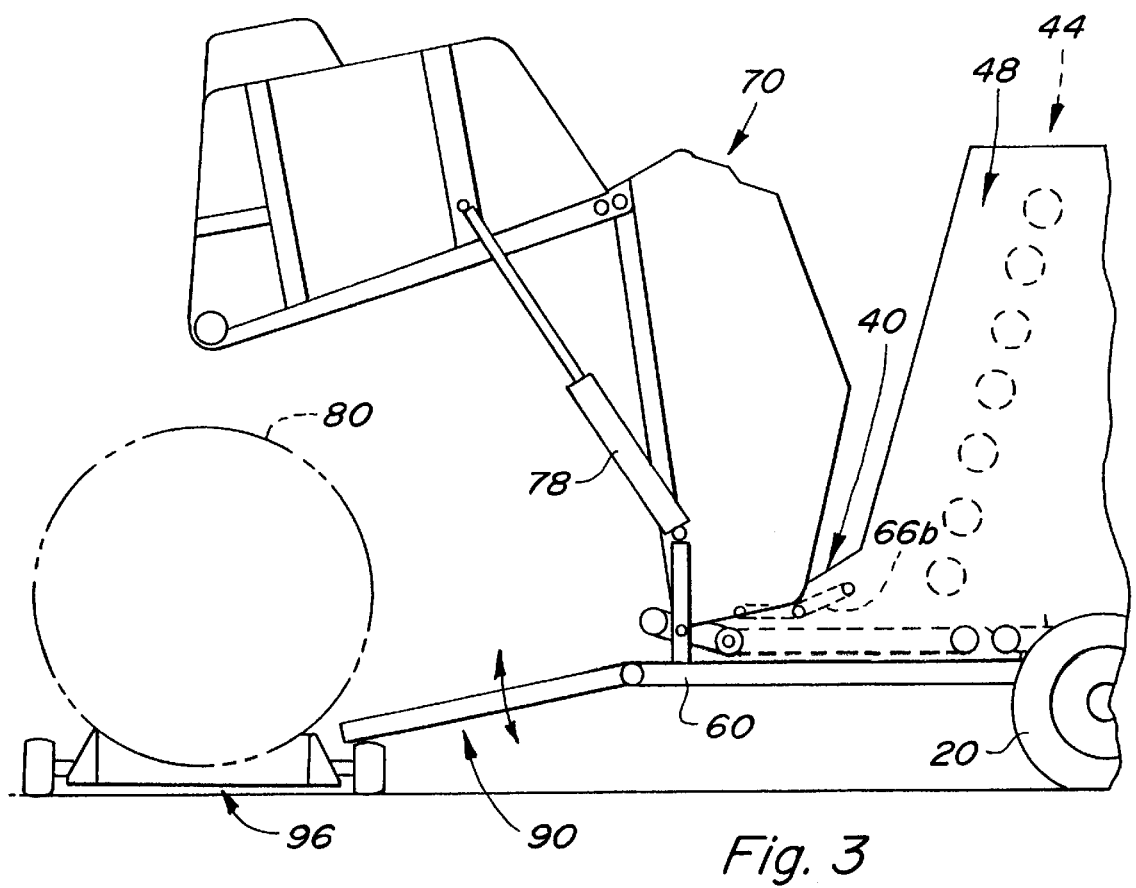
FIG. 3 is a schematic representation of the bale handling device loading a formed bale onto a bale hauling device.

The frame 18 includes an aft portion 60 extending rearwardly of the aft wall 38 and supporting a feed member 66 which opens into the egress area 40 and into the input area 68 of a baler 70 which preferably is a round baler of a conventional clam-shell construction. The baler 70 is supported on the aft portion 60. The baler 70 includes a front portion 72 fixed to the frame 18 and a rear portion 74 pivotally connected at an upper location 76 to the portion 72 for movement between a baling position (solid lines) wherein the portions 72 and 74 define a bale forming chamber, and a discharge position (broken lines) by hydraulic cylinder structure 78. The baler 70 as shown is generally of conventional round baler construction having driven belts or other suitable bale forming mechanisms such as rollers (not shown) receiving material from the input area 68 and forming the material into a compact cylindrically shaped bale such as shown at 80. Bale handling structure 90 is supported at the aft end of the frame portion 60 for receiving the formed bale 80 when the rear portion 74 is pivoted to the discharge position. The handling structure 90 includes a bale support 92 pivotally connected to the frame portion 60 and a hydraulic cylinder 94 for pivoting the support 92. The support 92 can be positioned to direct the formed bale onto the ground (broken lines) for pick up by conventional round bale handling equipment. Alternatively, the handling structure 90 can direct the bale onto a bale hauling device 96 (FIG. 3) for transport. If desired, the aft end of the frame portion 60 can be lifted hydraulically (arrow) so that the support 92 can be adjustably angled downwardly by the cylinder 94 to control bale roll onto the hauling device 96.

The floor conveyor 50 is selectively driven by drive structure 100 powered by the power take off (PTO) of the tractor 26 through a shaft 102. The dispensing structure 44 and baler 70 are also powered by the drive structure 100 or alternatively through a hydraulic drive powered by the tractor 26. Preferably, the dispensing structure 44 includes a plurality of fingered rotors 104 offset vertically above each other with the axes of the rotors lying generally along a plane which angles forwardly in the upward direction. The rotors 104 are spaced closely enough to define a compartment wall to prevent egress of cotton when the rotors are not driven. When the operator desires to move cotton from the mass and into the hopper area 48, the rotors 104 are driven in the same direction (see arrows) so the fingers pull the cotton from the mass and propel the cotton into the area 48. The conveyor 50a moves the cotton mass rearwardly as necessary to maintain the aft portion of the remaining cotton against the rotors 104. The conveyor 50b is independently operable to move the cotton to the feed member 66 and cooperates with converging upper belts 66b to form a mat of compressed cotton and direct the mat into the baler input area 68. The structure 10 may be towed through the field by the tractor 26 to receive the next basket dump. The system can be operated to form a bale while being towed and powered by the tractor. Since the structure 10 travels to the harvester 11 rather than the harvester traveling to the processing structure, and since bale forming can be continued during the travel time, productivity is greatly increased. More effective use of harvester and processor structure capacity can be achieved. Bulky and expensive ram structure for compressing the cotton in the structure 10 can be eliminated.

Figure 2:
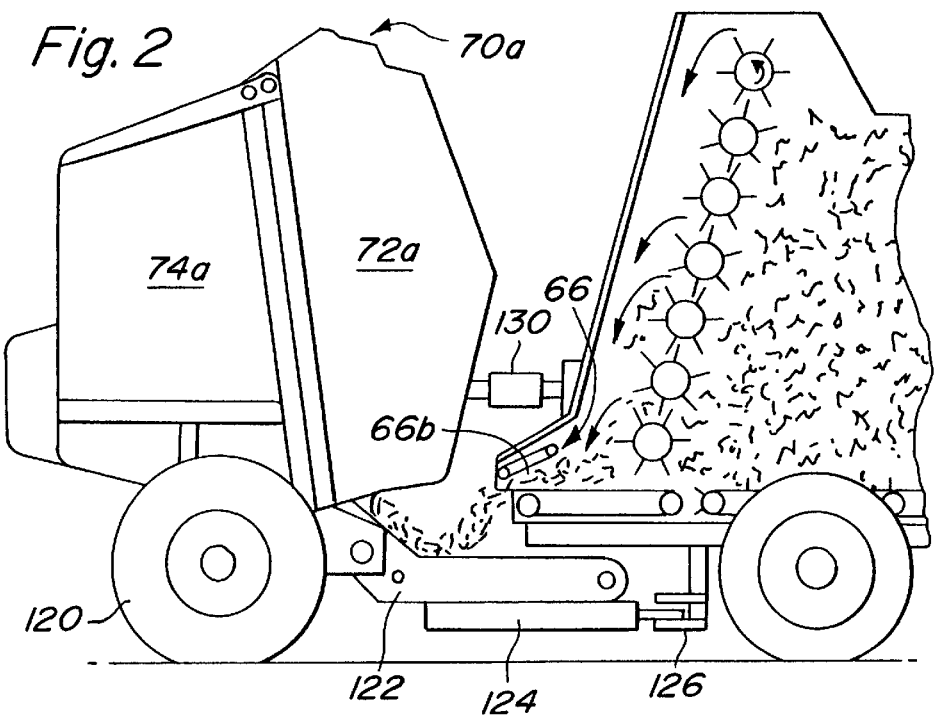
FIG. 2 is a schematic representation of an alternate embodiment of the invention utilizing a conventional round baler.

In an alternative embodiment, the baler 70 may be a commercially available round baler 70A (FIG. 2) supported on wheels 120 and having a modified, elongated windrow pick-up device 122 that fits under the frame portion 60 and a towing hitch 124. The baler 70A can be used for normal hay or straw baling operations with the modified pick-up device 122 positioned to pick up a windrow from the ground. For cotton baling operations, the hitch 124 can be connected to a rear hitch 126 on the structure 10. A PTO drive at the rear of the structure 10 (not shown) is connected to the drive structure 100 (or to a hydraulic drive powered by the tractor 26) and to a PTO drive 130 on the baler 70A. The structure 10 is operated as described above to feed cotton onto the rear floor conveyor 50b. However, the cotton is then moved directly onto the pick-up 122 where it is moved through the input area 68a and into the forming chamber defined by baler sections 72a and 74a. After formation, the compact cotton bale can be released to the ground and then picked up by conventional bale handling equipment such as a tractor loader. If desired to eliminate need for a modified pickup 122 and to facilitate backing, caster wheels may be utilized on the baler 70A and the baler connected to the frame 18 so the baler stays generally parallel to the structure 10.

Although round balers are shown and preferred, it is to be understood that other types of balers may also be used to provide a compact bale of cotton. Having described the preferred embodiment, it will become apparent that various modifications can be made without departing from the scope of the invention as defined in the accompanying claims.

We claim:

1. A cotton processing system for receiving and processing harvested cotton from a cotton receptacle of a mobile cotton harvester operating in a field, the system comprising:
   a frame supported for towing through the field by a towing vehicle and selectively positionable adjacent the cotton receptacle;
   bin structure supported by the frame and having a bottom area and side walls, a feed end and opposed wall structure supported on the frame for receiving a mass of harvested cotton from the receptacle;
   a conveyor located within the bin structure adjacent the bottom area and operable to move received cotton towards the feed end;
   a round baler selectively connectible to the frame and having an input pick-up device opening toward the feed end, wherein the baler includes wheel structure supporting the baler independently of the frame; and
   an upright hopper area located adjacent the feed end and receiving the moved cotton, the hopper area feeding cotton to the input pick-up device of the round baler, wherein the round baler provides a round compact bale from the cotton received from the bin structure and is detachable from the frame for baling material other than the cotton.

2. The processing system as set forth in claim 1 wherein the hopper is upright and further including upright dispensing structure located at the feed end and engaging the mass of received cotton as the received cotton is moved toward the feed end, the dispensing structure propelling the cotton into the upright hopper.

3. The processing system as set forth in claim 1 wherein the round baler includes baler hitch structure selectively connectible to the frame, wherein the input pick-up device is supported under the frame when the hitch structure is connected to the frame.

4. A cotton processing system for receiving and processing harvested cotton from a cotton receptacle of a mobile cotton harvester operating in a field, the system comprising:
   a frame supported for towing through the field by a towing vehicle and selectively positionable adjacent the cotton receptacle;
   bin structure supported by the frame and having a bottom area and side walls, a feed end and opposed wall structure supported on the frame for receiving a mass of harvested cotton from the receptacle;
   a conveyor located within the bin structure and operable to move received cotton towards the feed end;
   a baler with an upright chamber having top and bottom portions, wherein the baler is supported by the frame and includes an input adjacent the bottom portion; and
   an upright hopper located adjacent the feed end and receiving the moved cotton, the hopper including a lower egress area feeding cotton to the input of the round baler, wherein the round baler provides a round compact bale from the cotton received from the bin structure.

5. The processing system as set forth in claim 4 further comprising a bale handler supported adjacent the round baler for directing the compact bale towards a bale transport vehicle.

6. The processing system as set forth in claim 1 wherein the hopper comprises a portion of a module builder and the feed end includes rotating members engaging the module and directing cotton from the module into the upright hopper area.

7. The processing system as set forth in claim 4 further comprising compression structure located between the hopper area and the input and providing a compressed mat of cotton to the baler.

8. The processing system as set forth in claim 1 wherein the input pick-up device of the baler comprises a windrow pick-up device.

9. The processing system as set forth in claim 1 further comprising a bale support receiving the compact bale, and hydraulic positioning structure controlling the movement of the bale relative to the baler.

10. The processing system as set forth in claim 9 wherein the hydraulic positioning structure includes structure adjustably tilting the bale support.

11. A cotton processing system for receiving and processing harvested cotton from a cotton receptacle of a mobile cotton harvester operating in a field, the system comprising:
    a frame supported for towing through the field by a towing vehicle and selectively positionable adjacent the cotton receptacle;
    bin structure supported by the frame and having side walls, a feed end and opposed wall structure supported on the frame for receiving a mass of harvested cotton from the receptacle;
    a conveyor located within the bin structure and operable to move received cotton towards the feed end;
    a round baler having an input; and
    an upright hopper area located adjacent the feed end and receiving the moved cotton, the hopper area feeding cotton to the input of the round baler, wherein the round baler provides a round compact bale from the cotton received from the bin structure;
    a bale support receiving the compact bale, and hydraulic positioning structure controlling the movement of the bale relative to the baler; and
    further including a bale transport device positionable adjacent the bale support and wherein the hydraulic positioning structure is operable to angle the support to control movement of the bale from the support and onto the transport device.

12. The processing system as set forth in claim 1 wherein the baler comprises a hay baler having a pick-up device adapted for lifting hay or straw from the ground, and wherein cotton is fed onto the pick-up device.

13. The processing system as set forth in claim 12 wherein the baler includes ground support wheels and a baler hitch for towing the baler.

14. A method of processing cotton from the basket of a mobile cotton harvester operating in a cotton field, the method comprising:
    supporting bin structure on a mobile frame for movement in the cotton field to a desired location where the basket of the cotton harvester is to be unloaded;
    discharging the basket of cotton into the bin structure at the desired location;
    supporting a baler with an input feed device adjacent the bin structure;
    supporting a compacting conveyor adjacent an egress area of the bin structure;
    dispensing the cotton from the egress area of the bin structure to the compacting conveyer to provide a compacted mat;
    feeding the compacted mat to the input feed device; and
    operating the baler to form a compact bale of cotton from the compacted mat.

15. The method as set forth in claim 14 wherein the step of supporting a baler includes supporting a baler on the mobile frame.

16. The method as set forth in claim 14 wherein the step of supporting a baler includes supporting a hay baler having ground support wheels adjacent the egress area, and the step of dispensing the cotton to the input feed device includes moving cotton from the egress area with the compacting conveyor onto a windrow pick-up device of the baler.

17. The method as set forth in claim 14 wherein the step of operating the baler to form compact bales of cotton occurs during the movement of the bin structure in the cotton field.

18. The method as set forth in claim 14 wherein the step of supporting a baler includes mounting a round baler on the mobile frame adjacent the bin structure.

19. A method of processing cotton from the basket of a mobile cotton harvester operating in a cotton field, the method comprising:

supporting bin structure on a mobile frame for movement in the cotton field to a desired location where the basket of the cotton harvester is to be unloaded;

discharging the basket of cotton into the bin structure at the desired location;

supporting a baler with an input feed device adjacent the bin structure;

dispensing the cotton from an egress area of the bin structure to the input feed device;

operating the baler to form a compact bale of cotton;

providing a bale handling device; and further including the step of loading the compact bale of cotton on a bale hauling device, the step of loading including supporting a formed bale on a bale support movably mounted on the mobile frame and moving the bale support to cause the bale to move onto the bale hauling device.

20. The method as set forth in claim 19 wherein the step of supporting a baler comprises supporting a round baler, and wherein the step of moving the bale support includes tilting the bale support downwardly towards the bale hauling device and rolling the bale onto the bale hauling device.

21. The method as set forth in claim 14 including the step of forming a mat of cotton adjacent the egress area and wherein the step of dispensing the cotton from the egress area of the bin structure to the input feed device includes feeding the mat of material to the input feed device.

22. A system for forming a compact bale from cotton removed from plants by a cotton harvester operating in the field, the system comprising:

a wheeled frame adapted for movement over the field independently of the harvester;

upright bin structure supported by the frame and receiving harvested cotton from the cotton harvester, the bin structure including a lower egress area;

conveyor structure located in the bin structure moving the cotton to the egress area;

cotton compressing structure located adjacent the egress area for receiving cotton from the egress area;

a baler supported on the frame and having an input area in communication with the cotton compressing structure and receiving compacted cotton from the cotton compressing structure to form a compact cotton bale;

bale handling structure supported by the frame for receiving the formed bale and moving the bale to a bale pick-up position for transport from the field; and drive structure adapted for powering from the conveyor structure and baler from the towing vehicle.

23. The system as set forth in claim 22 wherein the baler comprises a round baler.

24. The system as set forth in claim 22 wherein the drive structure powers the conveyor structure and baler as the towing vehicle moves the wheeled frame over the field.

25. The system as set forth in claim 22 further comprising mat forming structure located between the egress area and the input area of the baler.

26. The system as set forth in claim 23 wherein the bale handling structure includes a tiltable support movable between a support position and a discharge position.

27. The system as set forth in claim 26 wherein the support includes a discharge end positionable adjacent a bale hauling device when the support is moved to the discharge position.

* * * * *